P. B. WALLS.
LOCK FOR LEVERS.
APPLICATION FILED DEC. 7, 1909. RENEWED NOV. 3, 1913.
1,087,619.
Patented Feb. 17, 1914.
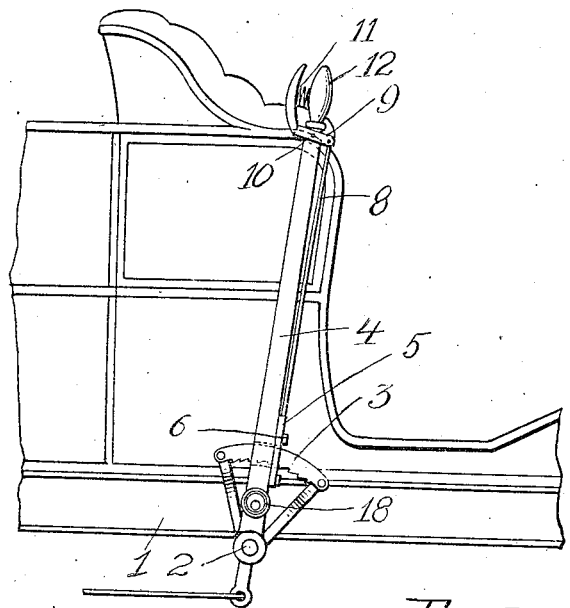
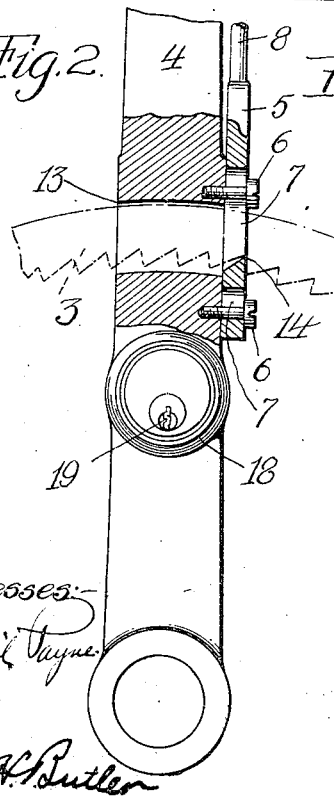
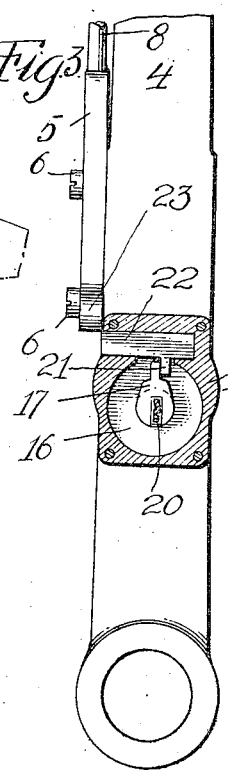
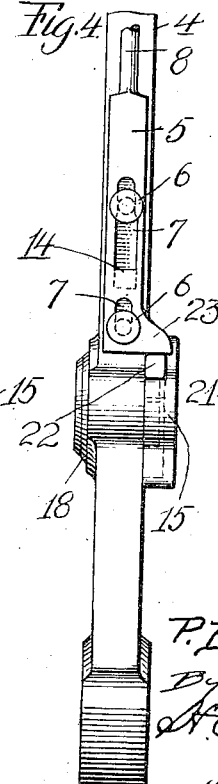
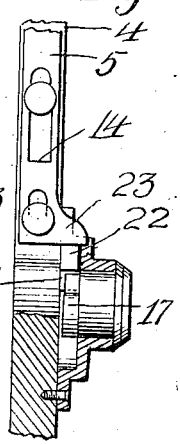
Witnesses:
Sam'l Payne
N. H. Butler
Inventor
P. B. Walls
By
H. C. Everts & Co.
Attorneys

UNITED STATES PATENT OFFICE.

PERCY B. WALLS, OF PITTSBURGH, PENNSYLVANIA.

LOCK FOR LEVERS.

1,087,619.  Specification of Letters Patent.  Patented Feb. 17, 1914.

Application filed December 7, 1909, Serial No. 531,856. Renewed November 3, 1913. Serial No. 799,021.

*To all whom it may concern:*

Be it known that I, PERCY B. WALLS, a citizen of the United States of America, residing at Pittsburgh, in the county of Allegheny and State of Pennsylvania, have invented certain new and useful Improvements in Locks for Levers, of which the following is a specification, reference being had therein to the accompanying drawing.

My invention relates to locking devices for automobiles or similar vehicles, and a means for locking gear, change speed, throttle, signal and other types of levers. Its main object, however, is to provide an improved locking device for locking automobile brake levers in any given position in which they may happen to be set, and to provide such a device as will be inexpensive, will involve the addition of few parts to the machine, and one which is not automatically operative so as to be liable to accidental locking.

While it is well known that various contrivances have been designed to lock the brake or change speed levers of automobiles to prevent the use of the same by unauthorized persons, so far as I know, all such devices have involved the use of an additional part or lock to be attached to the machine or lever when used; or have been impracticable of application to the modern type of automobile having a segmental rack near the lower end of the gear lever.

My invention, therefore, aims to provide a practical and simple device which can be set by merely turning the key in the lock, to which various types of lock are adaptable as desired, and which can be locked in any position the brake lever assumes on stoppage of the car, and which is not liable to accidental or automatic setting or locking.

The purpose of the device is to prevent unscrupulous persons from tampering with the motor car and starting it accidentally when located on a grade or inclination, or running the car when not authorized to do so.

To these ends my invention consists, generally stated, in an automobile lever locking device comprising in combination with the brake or change speed lever, a segment rack located necessarily near the bottom or rock shaft end of the same, and means for engaging said rack comprising preferably a latching member or rod extending along said lever operative from the upper handle in the usual manner, and a bolt movable on said lever and provided with a lock to actuate it into engagement with said rack engaging means to thereby lock the lever in any position.

In the drawing, Figure 1 is a side elevation showing an automobile brake lever provided with my locking device; Fig. 2 is a detail side view partly broken away and partly in section and showing on a larger scale the operation of the same; Fig. 3 is a similar view at right angles thereto showing the lock in section; Fig. 4 is a front elevation of the same, and Fig. 5 illustrates a modification in which the locking device is connected externally to the ordinary type of lever.

In the drawing the automobile body 1 and rock shaft 2 are of a conventional type, as is also the segment rack or sector 3 fixed to the automobile body 1. The brake lever 4 is pivoted to the rock shaft near its lower end, as illustrated in Fig. 1 and extends upwardly to about the height of the seats in the automobile.

The latching member 5 comprises the usual rod extending longitudinally of the brake lever and reduced in its upper portion 8 and pivotally connected to hand lever 9 which is pivoted to the brake lever 4 as at 10. The latching member or rod 5 may be slidably connected to the brake lever 4 in any desired manner, as by the screw bolts 6 mounted in the brake lever and extending through slot 7 provided therefor in the member 5.

A coiled spring 11 is interposed between the handle lever 9 and the handle 12 of the brake lever 4 so as to retain the latching member 5 normally in engagement with the rack 3. The rack 3 is preferably adapted to extend through the slot 7 in the latching member 5 and through the slot 13 in the brake lever 4. The lower edge of the slot 7 is so shaped as to provide a tooth at 14 adapted to engage the teeth of the rack 3. The latching member 5 is thus normally held by the spring 11 in engagement with the rack 3, and owing to the location of the spring 11, whether placed between the hand lever and the brake lever handle, or connected to the locking rod, a forward pressure on the hand lever tends always to unlatch or separate the latching member from the rack, in order to release the brakes, and during the backward motion or setting of the lever, the latching member will hold it in any position in the rack 3 it assumes.

It will be noticed that the latching member 5 is shown integral with its reduced upper or rod portion 8, but it may be detachably connected with the same where it is desired to apply my invention to automobiles in use.

The brake lever 4 is provided below the slot 13 with an enlargement or casing 15, as illustrated in Figs. 3 and 4 of the drawing, said enlargement or casing being provided with a cylindrical recess 16 having a latch 17, the latch being revolubly supported within the recess 16 by a front plate 18. The front plate 18 and the latch 17 are provided with a keyway 19 whereby the key 20 can be inserted to rotate the latch 17. The latch 17 is adapted to engage the depending lug 21 carried by the bolt 22 which is slidably mounted in the enlargement 15. The said bolt 22 is illustrated as attached to move outwardly beneath a locking lip 23 of the locking member 25. While this is my preferred construction, it will be understood that the bolt 22 and the latch 17 can be arranged so that the bolt moves longitudinally of the lever to lock the same, instead of transversely, as illustrated.

I prefer to embody the Yale or some other intricate and not easily picked lock in the brake lever to shift the bolt 22 and for this reason I have illustrated in Fig. 5 of the drawing, an ordinary type of lock secured to the outer side of the lever 4. In this embodiment it is unnecessary to change the lever in any manner other than to secure the lock thereto, as illustrated in Fig. 5.

In the operation of my device, it is plain that when the bolt 22 is in projected position beneath the locking lip 23 that the latching member cannot be lowered and is held in secure engagement with the rack 3. Hence the brake lever can be locked in any position it happens to assume when the car is stopped.

What I claim as new is:

1. A device of the class described including a lever having a transverse opening formed therein, a toothed rack extending through said opening, a latch slidably mounted for vertical movement on one longitudinal edge of the lever and having a slot formed therein for the reception of the rack, one wall of said slot being provided with a tooth adapted to engage the teeth on the rack, there being a locking lip on one edge of the latch and extending laterally beyond one face of the lever, and a locking member slidably mounted on one face of the lever and adapted when moved to extended position to bear against the face of the lip for locking the tooth of the latch in engagement with the rack.

2. A device of the class described including a lever, a rack, a slotted latch slidably mounted for longitudinal movement on one face of the lever and embracing the rack, one edge of the latch being extended laterally beyond the adjacent face of the lever to form a locking lip, a casing secured directly to one face of the lever, and a locking member slidably mounted in the casing and movable to extended position across and in contact with the locking lip, thereby to hold the latch in engagement with the rack, said latch being freely movable into and out of engagement with the rack when the locking member is in retracted position.

In testimony whereof I affix my signature in the presence of two witnesses.

PERCY B. WALLS.

Witnesses:
KARL H. BUTLER,
MARY M. HEDDEN.